United States Patent [19]

Toronto et al.

[11] Patent Number: 5,765,847
[45] Date of Patent: Jun. 16, 1998

[54] PEDAL MECHANISM FOR CYCLE AND EXERCISE EQUIPMENT

[75] Inventors: Salvatore Toronto; Paul Novak, both of San Diego, Calif.

[73] Assignee: Novator, L.L.C., San Diego, Calif.

[21] Appl. No.: 647,703

[22] Filed: May 14, 1996

Related U.S. Application Data

[63] Continuation-in-part of PCT/US95/01478, Feb. 2, 1995 continuation-in-part of Ser. No. 191,586, Feb. 4, 1994, Pat. No. 5,551,718.

[51] Int. Cl.$^6$ .................................................. B62M 1/02
[52] U.S. Cl. ........................ 280/237; 280/252; 280/261; 474/69; 474/84
[58] Field of Search ................................. 280/236, 237, 280/252, 253, 259, 260, 261; 474/69, 84

[56] References Cited

U.S. PATENT DOCUMENTS

| 603,326 | 5/1898 | Feingold | 280/237 |
|---|---|---|---|
| 2,286,154 | 6/1942 | Norred | 74/143 |
| 4,019,230 | 4/1977 | Pollard | 280/214 |
| 4,227,712 | 10/1980 | Dick | 280/236 |
| 4,473,236 | 9/1984 | Stroud | 280/258 |
| 4,501,169 | 2/1985 | Stilin | 74/812 |
| 4,564,206 | 1/1986 | Lenhardt | 280/252 |
| 4,574,649 | 3/1986 | Seol | 74/138 |
| 4,953,882 | 9/1990 | Craig, Jr. | 280/258 |
| 5,088,340 | 2/1992 | Seol | 74/143 |
| 5,105,688 | 4/1992 | Williams, III | 74/810.1 |
| 5,121,654 | 6/1992 | Fasce | 74/594.2 |
| 5,156,412 | 10/1992 | Meguerditchian | 280/241 |
| 5,163,886 | 11/1992 | Seol | 482/57 |
| 5,254,042 | 10/1993 | Chung-Suk | 474/69 |
| 5,351,575 | 10/1994 | Overby | 74/594.2 |
| 5,435,583 | 7/1995 | Foster, Jr. | 280/260 X |
| 5,533,741 | 7/1996 | Matsuo | 280/237 X |

FOREIGN PATENT DOCUMENTS

| 127260 | 4/1948 | Australia . |
| 2 219 261 | 12/1989 | United Kingdom . |

OTHER PUBLICATIONS

Biodex Medical Systems, Inc. –"The Biodex Advantage", advertising dated Jul. 1994.

Suntour One Speed Reverse Pedaling Device, drawn by Mr. Paul Novak (See Declaration of Salvatore Toronto dated 6 Nov. 1995, attached hereto).

Primary Examiner—Kevin Hurley
Attorney, Agent, or Firm—Lyon & Lyon LLP

[57] ABSTRACT

A bicycle mechanism to permit a forward force to be applied to the bicycle's drive wheel by backward rotation of the bicycle's pedals in addition to permitting a forward force to be applied to the drive wheel by a forward rotation of said pedals. The bicycle mechanism preferably has pedal arms, having pedals mounted thereon, mounted on a pedal shaft to drive the pedal shaft in a clockwise or counterclockwise direction, and a driving means to cause the forward movement of the bicycle when the pedal shaft is driven in either a clockwise or a counterclockwise direction. Alternatively, the bicycle mechanism includes a pedal sprocket mounted on the pedal shaft, a first chain assembly operably connected to the pedal sprocket, a second chain assembly operably connected to a drive wheel, and a third chain assembly operably connected to the first and second chain assemblies wherein the first chain assembly is capable of imparting a forward or clockwise rotation to the drive wheel when the pedal sprocket is driven in either a clockwise or counterclockwise direction.

25 Claims, 8 Drawing Sheets

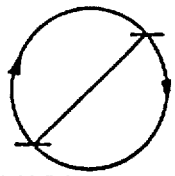

FORWARD PEDALING
*Fig. 7A*

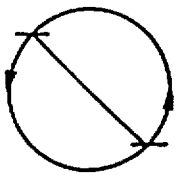

REVERSE PEDALING
*Fig. 7B*

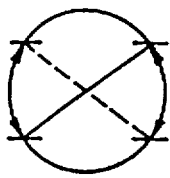

SCISSORS LEFT SIDE
*Fig. 7C*

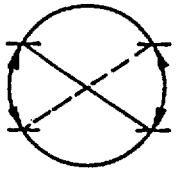

SCISSORS RIGHT SIDE
*Fig. 7D*

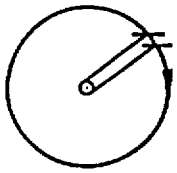

PARALLEL FORWARD
*Fig. 7E*

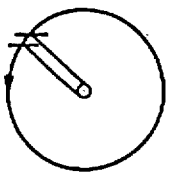

PARALLEL BACKWARD
*Fig. 7F*

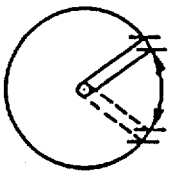

PARALLEL ALTERNATING FRONT
*Fig. 7G*

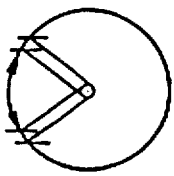

PARALLEL ALTERNATING BACK
*Fig. 7H*

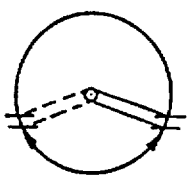

HALFMOON ALTERNATING DOWN
*Fig. 7I*

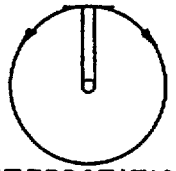

COUNTERROTATIONAL RIGHT
*Fig. 7J*

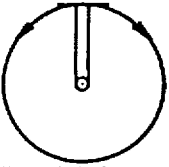

COUNTERROTATIONAL LEFT
*Fig. 7K*

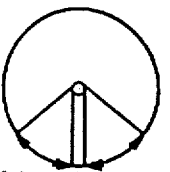

ROCKER DOWN
*Fig. 7L*

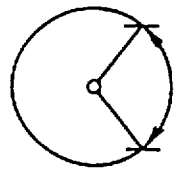

STAIR CLIMBING FORWARD
*Fig. 7M*

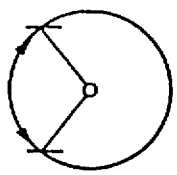

STAIR CLIMBING BACKWARD
*Fig. 7N*

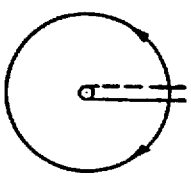

BIDIRECTIONAL RIGHT SIDE
*Fig. 7O*

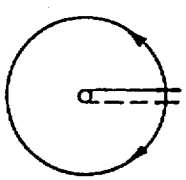

BIDIRECTIONAL LEFT SIDE
*Fig. 7P* ic. 5,765,847

PEDAL MECHANISM FOR CYCLE AND EXERCISE EQUIPMENT

This is application is a continuation-in-part of co-pending PCT International Application No. PCT/US95/01478, filed Feb. 2, 1995, designating the United States, and a continuation-in-part of application Ser. No. 08/191,586, filed Feb. 4, 1994 now U.S. Pat. No. 5,551,718.

FIELD OF THE INVENTION

This invention relates to pedal powered devices and in particular to bicycles and pedal powered exercise equipment.

BACKGROUND OF THE INVENTION

Bicycle riding is excellent exercise. Vigorous biking is wonderful for general body health in that it produces increased heart pumping to supply increased blood to the large leg muscles. There is not the constant leg impact associated with jogging.

In the basic bicycle design, a chain sprocket on the rear wheel of the bicycle is driven by a bicycle chain through a chain sprocket powered by a pedal shaft driven by the legs and feet of the bicyclist operating on a pair of bicycle pedals attached to the pedal shaft.

For the typical bicycle to move in the forward direction, the bicyclist applies force to the pedals causing them to rotate in the same rotational direction as the wheels of the bicycle for forward motion. (This rotational direction is hereinafter referred to as the "forward direction". The reverse direction is hereinafter referred to as the "reverse direction". In some cases we will refer to rotational direction of various parts of the bicycle as either clockwise or counterclockwise. In such cases it will be assumed that we are viewing the bicycle from its right side, and in all of the figures we will be viewing the bicycle and the bicycle parts from the right side.) Typical bicycles in use today do not operate in reverse. For these bicycles the pedals can be rotated in the counter-clockwise direction when the bicycle is moving forward, but such motion provides no force to the wheels of the bicycle. Thus, with prior art bicycles, force can be applied to the wheels of the bicycle only by rotating the pedals in the forward direction. Normally force is applied to the rear wheel only on the downward stroke of the pedals; however it is fairly common practice for bicyclists to clamp their shoes to the pedals. Then force can also be applied to the rear wheel on the upward stroke of the pedals.

With prior art bicycles there is no way to apply forward force to the wheels of the bicycle with a reverse motion of the pedals. Such an improvement would increase the value of the bicycle as an exercise device and also provide an alternate method of propulsion emphasizing use of different leg and related muscles which would increase endurance for long bike trips.

What is needed is a bicycle mechanism which will permit the bicyclist to apply forward driving force to the wheels of the bicycle with both forward and reverse motion of the pedals to obtain these performance enhancements.

SUMMARY OF THE INVENTION

The present invention provides a bicycle attachment to permit a forward force to be applied to the bicycle's drive wheel by reverse rotation of the bicycle's pedals in addition to permitting a forward force to be applied to the back wheel by a forward rotation of said pedals. A preferred embodiment allows each pedal to be simultaneously rotated in opposite directions.

The present invention is well suited to provide a wide range of exercise routines for the user in order to tone thighs, hamstrings, calves, abdominal, back and various upper front and side-body muscles. The invention provides reverse conventional pedaling, forward reciprocal pedaling, reverse reciprocal pedaling, kangaroo or pogo-stick pedaling, and counter (alternating forward and backward) pedaling.

The invention is unobtrusive, and barely visible from the right side of the bicycle. It is very light weight and can be easily installed on most existing bicycles or incorporated into the design of new bicycles.

BRIEF DESCRIPTION OF THE DRAWINGS

FIG. 7 shows a variety of pedaling positions which can be performed with the present invention.

DETAILED DESCRIPTION OF PREFERRED EMBODIMENTS

Forward Motion with Forward or Reverse Pedaling

Figure 1A:
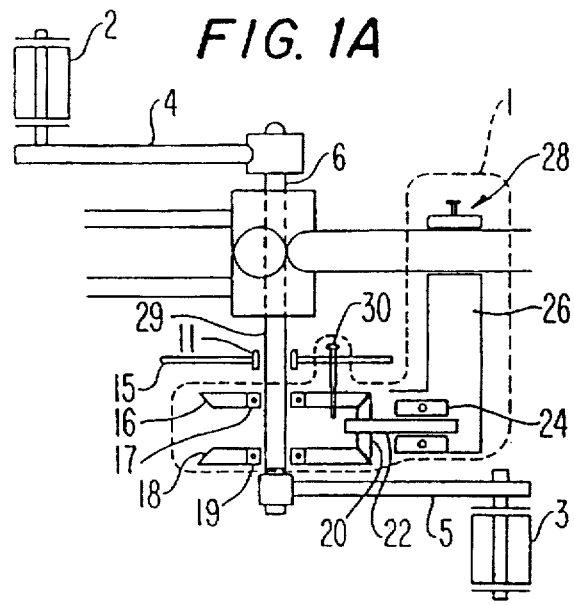
FIG. 1A is a top view of a bicycle frame and crankshaft shown partially in section with first embodiment of the present invention incorporated thereon.
Figure 1B:
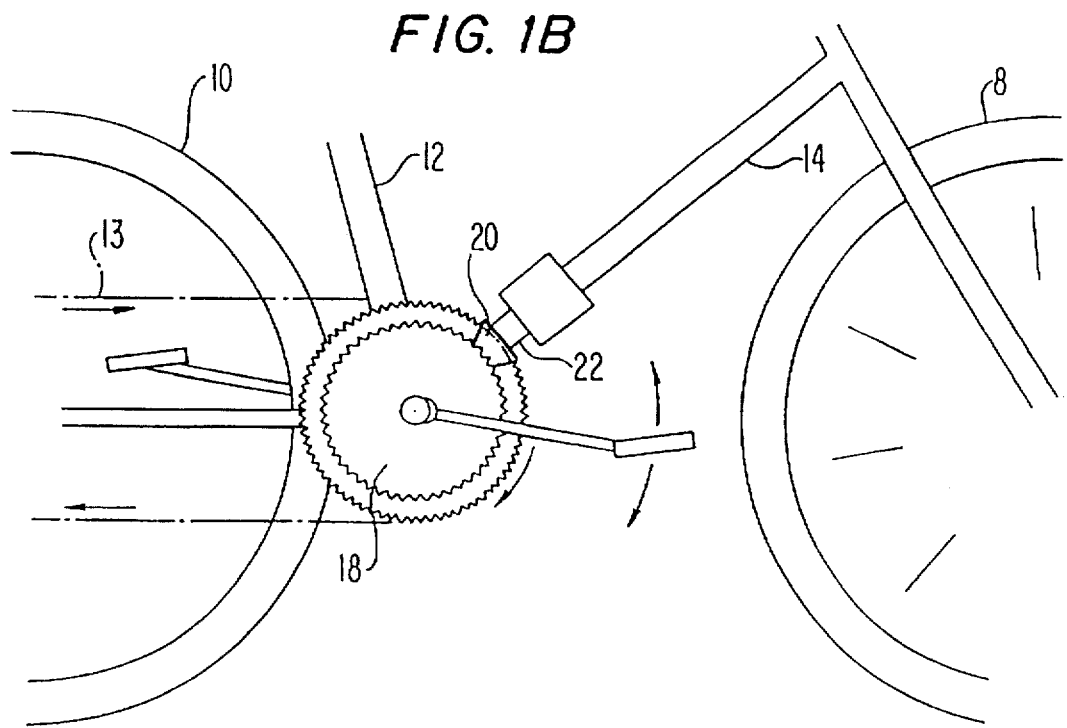
FIG. 1B is a side view of the bicycle frame and crankshaft of FIG. 1.

FIGS. 1A and 1B illustrate an embodiment of the present invention which provides for forward motion of the bicycle with either forward or reverse rotation of the pedals. This embodiment is provided by adding specified equipment to a standard bicycle. The additional equipment is depicted within the dashed line 1 on FIG. 1A. FIGS. 1A and 1B show the standard bicycle parts relevant to this invention. Left pedal 2 and right pedal 3 are attached to pedal shaft 6 via pedal arms 4 and 5 respectively. Seat tube 12 and down tube 14 form the bicycle frame. Front wheel 8, drive wheel 10, drive chain 13 and pedal sprocket 15 are attached to the bicycle frame.

In this embodiment pedal shaft 6 has been extended with an adapter 29 so that the gear equipment shown in FIG. 1A can be added. Added parts are bevel gears 16 and 18 and reversing bevel gear 20. Reversing gear 20 is gear matched to gears 16 and 18 and rotates on reversing gear shaft 22 which rotates within bearings 24 mounted in frame 26 which is fixed to down tube 14 by clamp 28. Gear 16 is mounted on freewheeling clutch 17 which allows gear 16 to rotate freely (i.e. without applying power to the crank) in the counterclockwise direction about shaft 6 but rotate with and drive the shaft 6 (i.e. applying power to the crank) in the clockwise direction. Gear 18 is mounted on freewheeling clutch 19 which allows gear 18 to rotate freely in the clockwise direction about shaft 6 but rotate with and drive the shaft 6 in the counterclockwise direction. Gear 16 is fixed to rotate with pedal sprocket 15 by fastener 30. The pedal arms 4 and 5 are fixed to and rotate with the shaft 6. The sprocket 15 is mounted to rotate freely on the shaft 6 by a bearing 11.

When the bicyclist rotates pedals 2 and 3 in the clockwise direction, pedal shaft 6 rotates in the clockwise direction also. The clockwise rotation of pedal shaft 6 causes freewheeling clutch 17 to engage, which in turn causes bevel gear 16 to rotate in the clockwise direction in unison with pedal shaft 6. This action imparts a clockwise motion to pedal sprocket 15 through fastener 30 thus driving the chain 13, rear sprocket, and rear wheel 10 in the clockwise direction.

The forward rotation of bevel gear 16, in addition to imparting clockwise rotation to fastener 30, rotates bevel gear 18 in the counterclockwise direction through reversing gear 20. Freewheeling clutch 19 does not engage however, thereby allowing bevel gear 18 to rotate in the counter clockwise direction while pedal shaft 6 rotates in the clockwise direction.

When the bicyclist rotates pedals 2 and 3 in the counterclockwise direction, pedal shaft 6 rotates in the counterclockwise direction also. The counterclockwise rotation of pedal shaft 6 causes freewheeling clutch 19 to engage, thereby causing bevel gear 18 to rotate counterclockwise in unison with pedal shaft 6. The counterclockwise rotation of bevel gear 18 causes bevel gear 16 to rotate in the clockwise direction through reversing gear 20. Bevel gear 16 is able to rotate in the clockwise direction while the pedal shaft 6 rotates in the counterclockwise direction because freewheeling clutch 17 does not engage when pedal shaft 6 rotates counterclockwise. This action drives pedal sprocket 15 in the clockwise direction about bearing 11 while pedal shaft 6 rotates in the counterclockwise direction. As previously described, the clockwise rotation of bevel gear 16 causes the rear wheel 10 to rotate in the clockwise direction via fastener 30, chain sprocket 15, chain 13, and the rear sprocket.

No significant loss of energy or total bicycle efficiency results from the rotation of gears 18 and 20 when the pedals are rotated in the forward direction or the reverse direction. Due to some small gear losses there is some reduction in total bicycle efficiency but not much. We estimate this efficiency loss in the gears to be practically imperceptible.

Thus, with this improvement the bicyclist can pedal alternatively clockwise or counter-clockwise. The ways in which the bicycle can be pedaled with this embodiment include forward pedaling, reverse pedaling, scissors left side, and scissors right side (see FIG. 7.) This variety of the pedal rotation utilizes the leg and related muscle groups in slightly different ways which increases overall endurance and makes traveling long distances easier for the bicyclist.

Gears 16 and 18 are preferably sized to fit within the diameter of the existing crankcase. Persons skilled in the art will recognize that many other gear arrangements and sizes will work effectively. An appropriate housing for the gears should be provided using techniques well known in the art.

Kangaroo Stroke

Figure 2A:
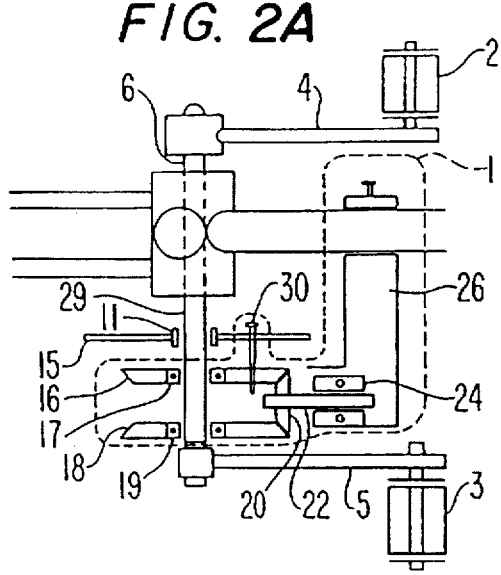
FIG. 2A is a top view of a bicycle frame and crankshaft shown partially in section with a second embodiment of the present invention incorporated thereon.
Figure 2B:
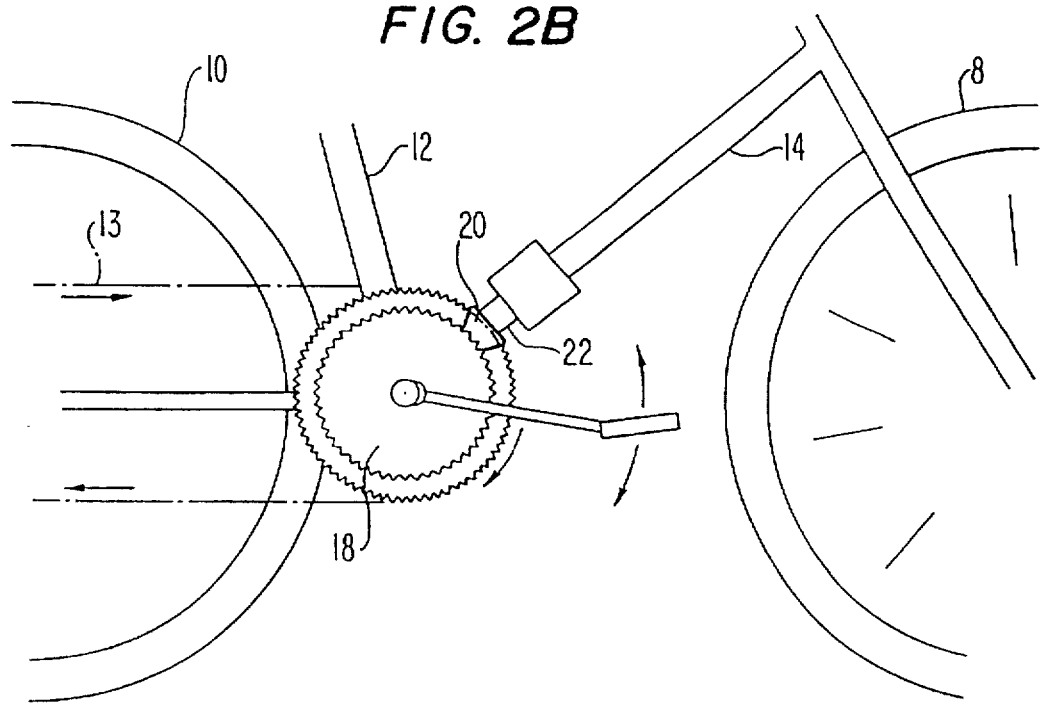
FIG. 2B is a side view of the bicycle frame and crankshaft of FIG. 2A.

FIGS. 2A and 2B show a slightly different embodiment using the same parts as shown in FIGS. 1A and 1B. FIGS. 2A and 2B differ from FIGS. 1A and 1B only in the position of the pedals. Specifically, in FIGS. 2A and 2B, both pedal arms 4 and 5 are parallel to each other and point towards the front of the bicycle. Pedal Arms 4 and 5 remain parallel to each other since each is fixed to pedal shaft 6.

In this embodiment, the bicyclist's shoes should be firmly attached to pedals 2 and 3. Commercially available equipment, such as toe clips or shoes which directly bolt to pedals 2 and 3, can be used to firmly attach the shoes to the pedals.

To propel the bicycle, the bicyclist simultaneously pushes down on pedals 2 and 3, then simultaneously pulls up on pedals 2 and 3. Both the downward stroke and the upward stroke impart power to rear wheel 10. Specifically, when the bicyclist pushes down on pedals 2 and 3, pedal shaft 6, which is fixed to pedal arms 4 and 5, rotates in the clockwise direction. The clockwise rotation of pedal shaft 6 causes freewheeling clutch 17 to engage, which in turn causes bevel gear 16 to rotate in the clockwise direction in unison with pedal shaft 6. As previously described, the clockwise rotation of bevel gear 16 causes rear wheel 10 to rotate in the clockwise direction via fastener 30, pedal sprocket 15, and chain 13.

When the bicyclist pulls up on pedals 2 and 3, pedal shaft 6 rotates in the counterclockwise direction. The counterclockwise rotation of pedal shaft 6 causes freewheeling clutch 19 to engage, thereby causing bevel gear 18 to rotate counterclockwise in unison with pedal shaft 6. The counterclockwise rotation of bevel gear 18 causes bevel gear 16 to rotate in the clockwise direction through the action of reversing gear 10. Bevel gear 16 is able to rotate clockwise around pedal shaft 6 which is rotating counterclockwise because freewheeling clutch 17 does not engage when pedal shaft 6 is rotating in the counterclockwise direction. The clockwise rotation of bevel gear 16 causes rear wheel 10 to also rotate in the clockwise direction via fastener 30, pedal sprocket 15, and chain 13.

If desired, limiters can be provided at 2:00 and 4:00 o'clock to limit movement of the pedals between the 2:00 and 4:00 o'clock position. Alternatively, the limiters can be arranged in other positions to provide a great variety of back and forth, clockwise or counterclockwise leg motions. Many of these options provide great exercise for the abdominal and gluteal and related muscles. Using this embodiment of the invention, the bicyclist can pedal the bicycle in the following modes: parallel forward, parallel backward, and rocker down (see FIG. 7).

Stair Climbing

Figure 3A:
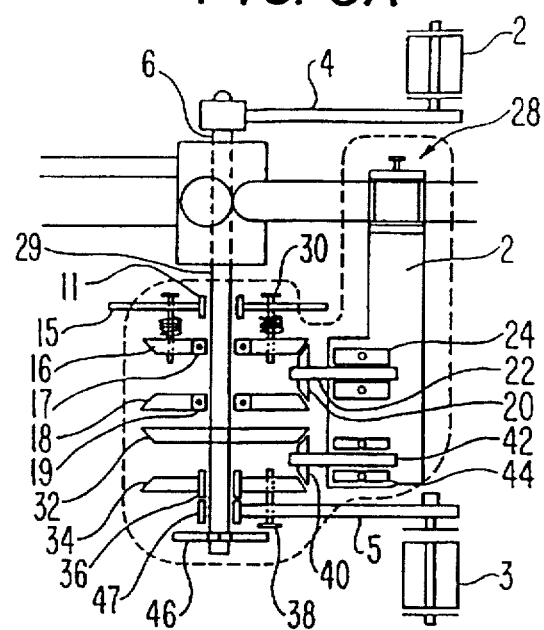
FIG. 3A is a top view of a bicycle frame and crankshaft shown partially in section with a third embodiment of the present invention incorporated thereon.
Figure 3B:
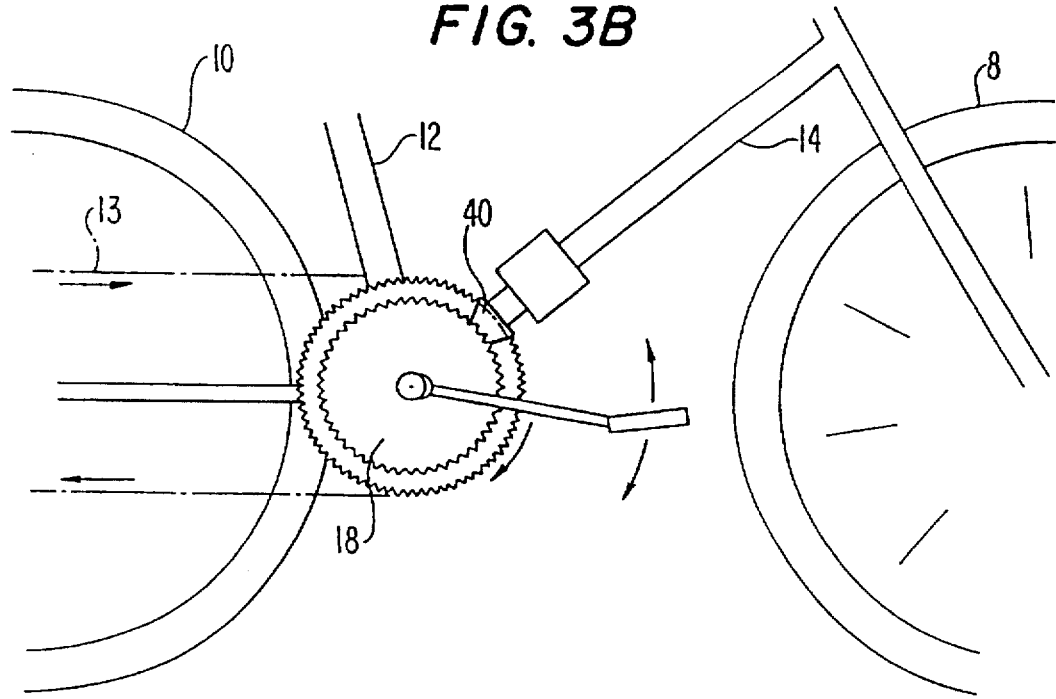
FIG. 3B is a side view of the bicycle frame and crankshaft of FIG. 3A.

FIGS. 3A and 3B illustrate an embodiment which provides for forward bicycle motion when pedals 2 and 3 simultaneously rotate in opposite directions which allows alternating reciprocating pedal motion to drive the bicycle forward. The alternating motions can be started from any major quadrant. This embodiment contains the parts shown in FIGS. 1A and 1B and two additional bevel gears 32 and 34, (similar to gears 16 and 18). It should be noted that both sets of gears are shown on the right side of the bicycle frame for the convenience of illustration only. Those skilled in the art will realize that one set of the gears could be placed on the left side of the bicycle, or both sets of gears could be placed within the housing of the lower bracket (crank case). Reversing idler gear 40 is matched to gears 32 and 34 and gear 40 rotates on reversing shaft 42 which in turn rotates within bearing 44 mounted in frame 2. Gear 32 is fixed to pedal shaft 6 and gear 34 rotates freely about pedal shaft 6 on bearing 36. Right pedal arm 5 also rotates freely about pedal shaft 6 on bearing 47. Because of the arrangement of gears 32 and 34, pedals 2 and 3 must of necessity rotate in opposite directions. Since gear 32 is engaged in gear 34, pedal 3 rotates in the direction opposite of the direction of rotation of pedal shaft 6 whereas pedal 2 rotates in the same direction as pedal shaft 6. Because of the above described arrangement, reciprocating motion of the pedals will produce forward motion of the bicycle. This embodiment is excellent for stair climbing type of leg motion to exercise gluteal and greater hamstring muscles in addition to the other leg muscles. Using this embodiment of the invention, the bicyclist can pedal the bicycle in the following modes: parallel alternating front, parallel alternating back, half-moon alternating down, counter-rotational right, counter-rotational left, stair climbing forward, stair climbing backward, bidirectional right side and bidirectional left side (see FIG. 7). A limiter could also be engaged for limiting the alternating pedal movement between 7:00 and 11:00 o'clock and 1:00 to 5:00 o'clock respectively.

More specifically, when pedal arm 4 is driven in the clockwise direction, pedal shaft 6, which is fixed to pedal arm 4, also rotates in the clockwise direction. This action causes freewheeling clutch 17 to engage, thereby causing bevel gear 16 to rotate in the clockwise direction in unison with pedal shaft 6. The clockwise rotation of bevel gear 16 causes rear wheel 10 to also rotate in the clockwise direction via fasteners 30, pedal sprocket 15, and chain 13. The clockwise rotation of bevel gear 16 causes bevel gear 18 to rotate in the counterclockwise direction via reversing gear 20. Bevel gear 18 is able to rotate about pedal shaft 6, which is rotating in the clockwise direction, because freewheeling clutch 19 does not engage when pedal shaft 6 is driven in the clockwise direction.

When pedal arm 4 is driven in the counterclockwise direction, pedal shaft 6 also rotates in the counterclockwise direction. This action causes freewheeling clutch 19 to engage, thereby causing bevel gear 18 to rotate counter-clockwise in unison with pedal shaft 6. The counterclockwise rotation of bevel gear 18 causes bevel gear 16 to rotate in the clockwise direction via reversing gear 20. Bevel gear 16 is able to rotate clockwise around pedal shaft 6 which is rotating counterclockwise because freewheeling clutch 17 does not engage when pedal shaft 6 is rotating counterclockwise. The clockwise rotation of bevel gear 16 causes pedal sprocket 15 to rotate in a clockwise direction via fasteners 30. Pedal sprocket 15 is able to rotate in a clockwise direction around bearings 11 while pedal shaft 6 rotates counterclockwise. The clockwise rotation of pedal sprocket 15 causes rear wheel 10 to rotate clockwise via chain 13.

When pedal arm 5 is driven in the clockwise direction, bevel gear 34 also rotates in the clockwise direction via fastener 38 which is fixedly attached to pedal arm 5 and bevel gear 34. This action causes bevel gear 32 to rotate in the counterclockwise direction via reversing gear 40. Since bevel gear 32 is fixed to pedal shaft 6, pedal shaft 6 will rotate in the counterclockwise direction along with bevel gear 32. Pedal shaft 6 can rotate in the opposite direction of pedal arm 5 because pedal arm 5 rotates around pedal shaft 6 on bearing 47. The counterclockwise rotation of pedal shaft 6 causes freewheeling clutch 19 to engage, thereby causing bevel gear 18 to rotate counterclockwise in unison with pedal shaft 6. The counterclockwise rotation of bevel gear 18 causes bevel gear 16 to rotate clockwise via reversing gear 20. The clockwise rotation of bevel gear 16 causes rear wheel 10 to also rotate in the clockwise direction via pedal sprocket 15 and chain 13.

When pedal arm 5 is driven in the counterclockwise direction, bevel gear 34 also rotates in the counterclockwise direction via fastener 38. This action causes bevel gear 32 to rotate in the clockwise direction via reversing gear 40, which in turn causes pedal shaft 6 to rotate in the clockwise direction since bevel gear 32 is fixed to pedal shaft 6. The clockwise rotation of pedal shaft 6 causes freewheeling clutch 17 to engage, thereby causing bevel gear 16 and the pedal sprocket 15 to rotate in the clockwise direction.

With the above arrangement the bicyclist is able to drive the bicycle forward with alternate clockwise and counterclockwise strokes with the pedals 2 and 3 respectively.

Connecting the pedal arm 5 to flange 46 instead of gear 34 permits operation of the bicycle in a continuous mode with both pedals rotating in the same direction as described in the two previous sections. Since flange 46 and pedal arm 4 are fixedly attached to pedal shaft 6, pedal arm 4, flange 46 (and pedal arm 5 when it is attached to flange 46) and pedal shaft 6 always rotate in the same direction.

Exercise Bicycle

The bicycle could be mounted on a stationary exercise frame such as units marketed by Minoura and Blackburn Corporations. As a result most regular bicycles can be converted to a multiple variation exercise machine providing a very wide variety of exercise options.

Relative Pedal Positions

Persons skilled in the art will note that in all of the embodiments of the present invention discussed above, the pedals rotate at the same speed either in the same direction or different directions. In either case the relative starting positions can be important. These starting positions can be established in a wide variety of ways such as fixing the pedal arm at specific relative positions on pedal shaft 6 or on gear 34 or on flange 46.

Remote Adjustment of Pedal Position and Relative Pedal Rotation

Figure 5:
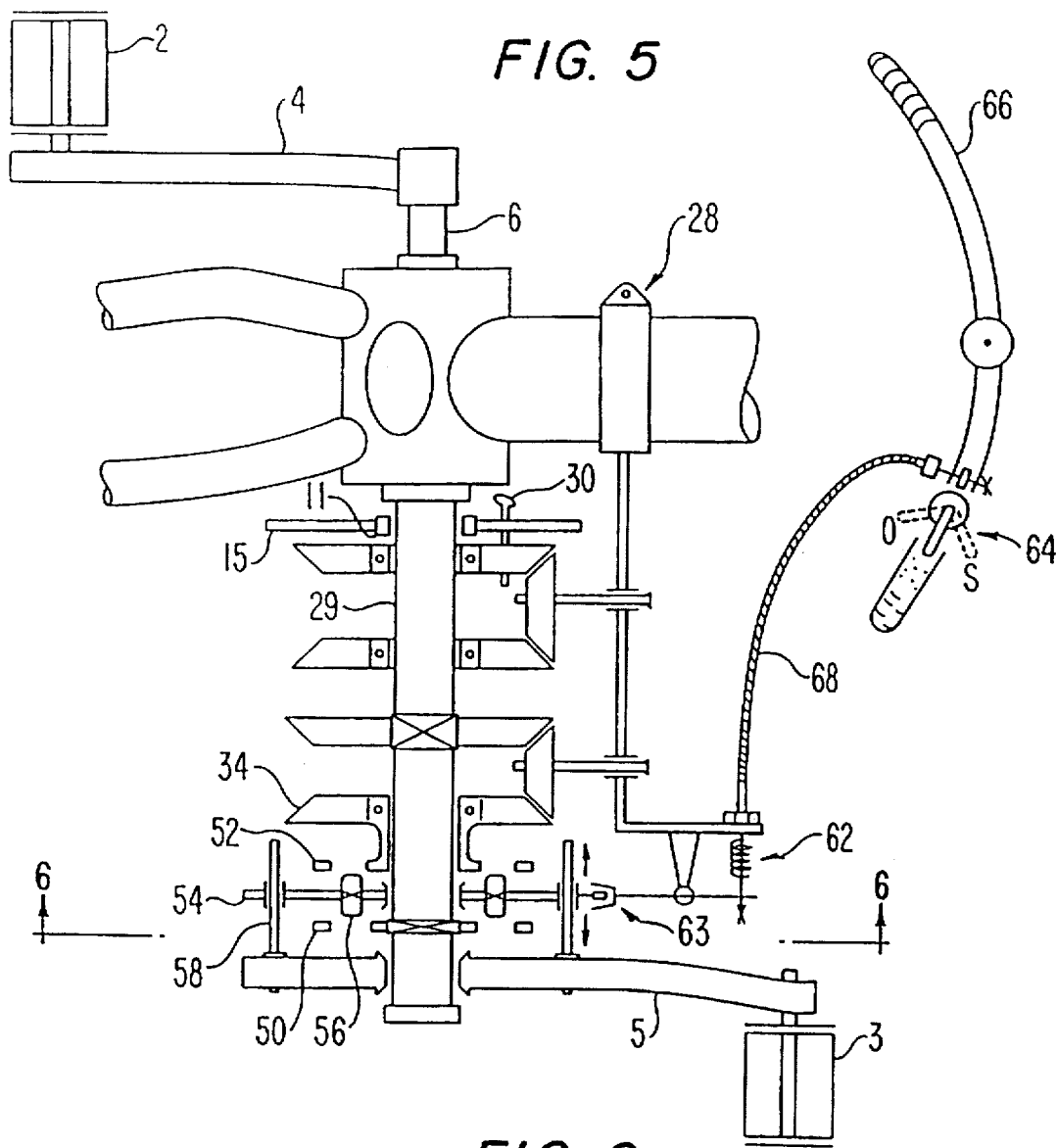
FIG. 5 is a top view shown partially in section of the embodiment of FIG. 3A modified to have a kinetic modes switching unit where forward or reverse pedaling and relative pedal positions are selected from the bicycle handlebar.
Figure 6:
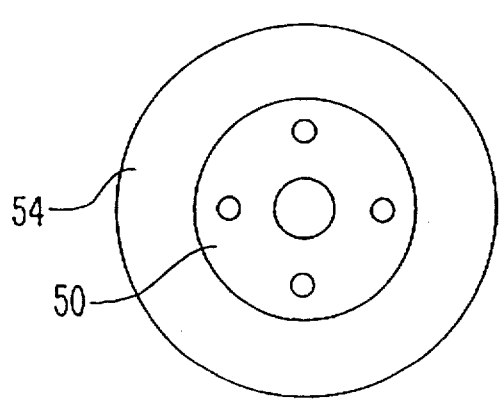
FIG. 6 is a sectional view taken along line 6—6 of FIG. 5 showing an assembly of positional discs and a control disc used in the kinetic mode switching unit.

It is feasible to provide for selection of relative pedal positions and relative direction of rotation at the will of the bicyclist while riding down the road. This can be done with a clutch-cable arrangement with controls at the handlebar as is shown in FIGS. 5 and 6. As shown in FIG. 5, the basic arrangement of the pedal shaft and the gears is the same as shown in FIGS. 3A and 3B. Positional discs 50 and 52 have been added along with control disc 54 and pins 56. Positional disc 52 is attached to gear 34 and turns freely on pedal shaft 6. Positional disc 50 is fixed to pedal shaft 6. Pedal arm 5 rotates freely on shaft 6 and through prongs 58 is slidably coupled to control disc 54. Axial movement of the control disc 54 along the shaft 6 is caused by shifting mechanism 62 which is remotely actuated through lever 64 mounted on the handlebar 66. Boden cable 68 provides the link between actuator 64 and the shifter 62. FIG. 6 shows a side view of the positional discs 50 as well as control disc 54. Positional discs 50 and 52 have four holes equally spaced from the central axis of the pedal shaft and represent the four major quadrants. Control disc 54 has two pins 56 which are 180 degrees apart and which match the holes in positional discs 50 and 52. The rim of control disc 54 is held in a particular position by shifting mechanism 62 through a slidable joint 63. As the bicyclist moves shifter 64, control disc 54 is axially displaced along pedal shaft 6. With shifter 64 at "O", engaging pins 56 engage into positional disc 52 for alternating pedaling (the right side pedal moves in the rotational direction opposite that of the left pedal and the pedal shaft). This action results from the fact that positional disc 52 is fixed to bevel gear 34, and therefore rotates in the same direction as bevel gear 34. When pedal shaft 4 rotates in the clockwise direction, bevel gear 34 rotates in the counter-clockwise direction, thereby causing positional disc 52 to rotate in the counterclockwise direction, thereby dictating that pedal arm 5 rotate in the counterclockwise direction because it is connected to control disc 54 via pins 58. When shifter 64 is moved to the S position, engaging pins 58 engage into positional disc 50 for continuous forward or reverse pedaling (the right side pedal moves in the same rotation direction as the pedal shaft and the left pedal). Since positional disc 50 is fixed to pedal shaft 6, positional disc 50 rotates in the same direction as pedal shaft 6 pedal arm 4. With control disc 54 engaged with positional disc 50, control disc 54 rotates in the same direction as positional disc 50, thereby rotating pedal arm 5 in the same direction as pedal arm 4 via pins 58. While shifter 64 is in the neutral position N the pedals can be moved to any position relative to each other. However, when shifter 64 is in the neutral position pedal arm 5 is unable to impart any force to the gears of the invention.

Wide Variety of Options

FIG. 7 summarizes some of the wide variety of pedaling options available with this invention.

Other Gear Arrangements

Figure 4:
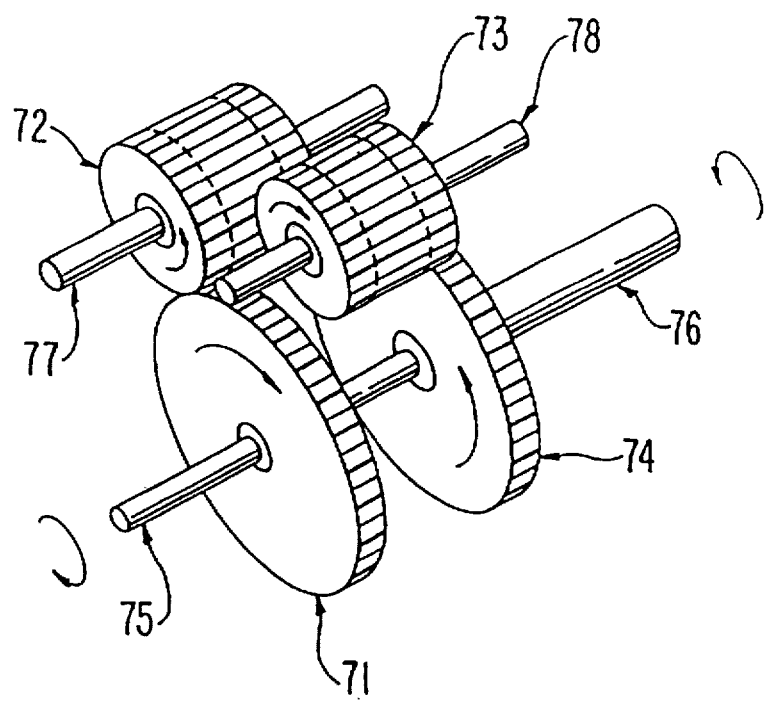
FIG. 4 shows an alternative configuration of spur gears which can be used to implement reverse pedaling in the embodiments of FIGS. 1–3.

Although the present invention has been described above making use of bevel gears, persons skilled in this art will recognize that many other gear arrangement could be used with essentially equivalent results. One preferred alternative would be to use spur gears to achieve the reversing effects described above. FIG. 4 illustrates how the reversing effects are achieved with spur gears. Drive shaft 75 is fixed to gear 71, which engages idler gear 72 rotating on shaft 77. Gear 72 has an enlarged width relative to that of gears 71 and 74. Idler gear 73 which rotates on shaft 78 engages idler gear 72 as well as gear 74. Idler gear 73 has an enlarged width compared to gears 71 and 74. Output shaft 76 is fixed to gear 74 and is concentric to input shaft 75. Spacing between idlers and gears 71 and 74 are such that they never interlock themselves with each other, in this way achieving concentric reverse rotation between input shaft 75 and exit shaft 76. Persons skilled in the art will also recognize that these reversing effects can also be accomplished with a chain and sprocket arrangement.

Chain Drive Arrangement

Figure 8:
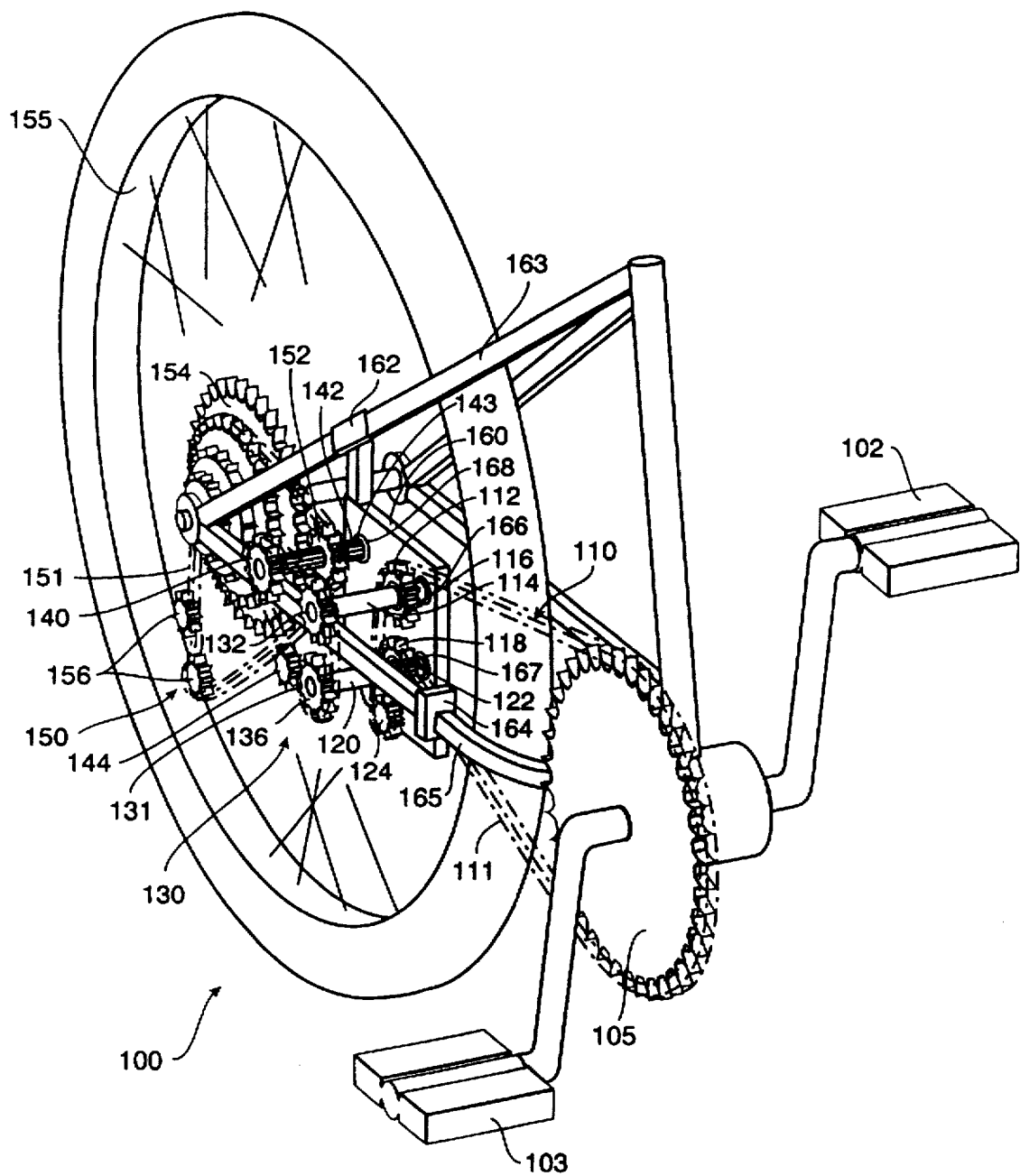
FIG. 8 is an isometric view of a partial bicycle frame showing a chain drive embodiment.
Figure 9:
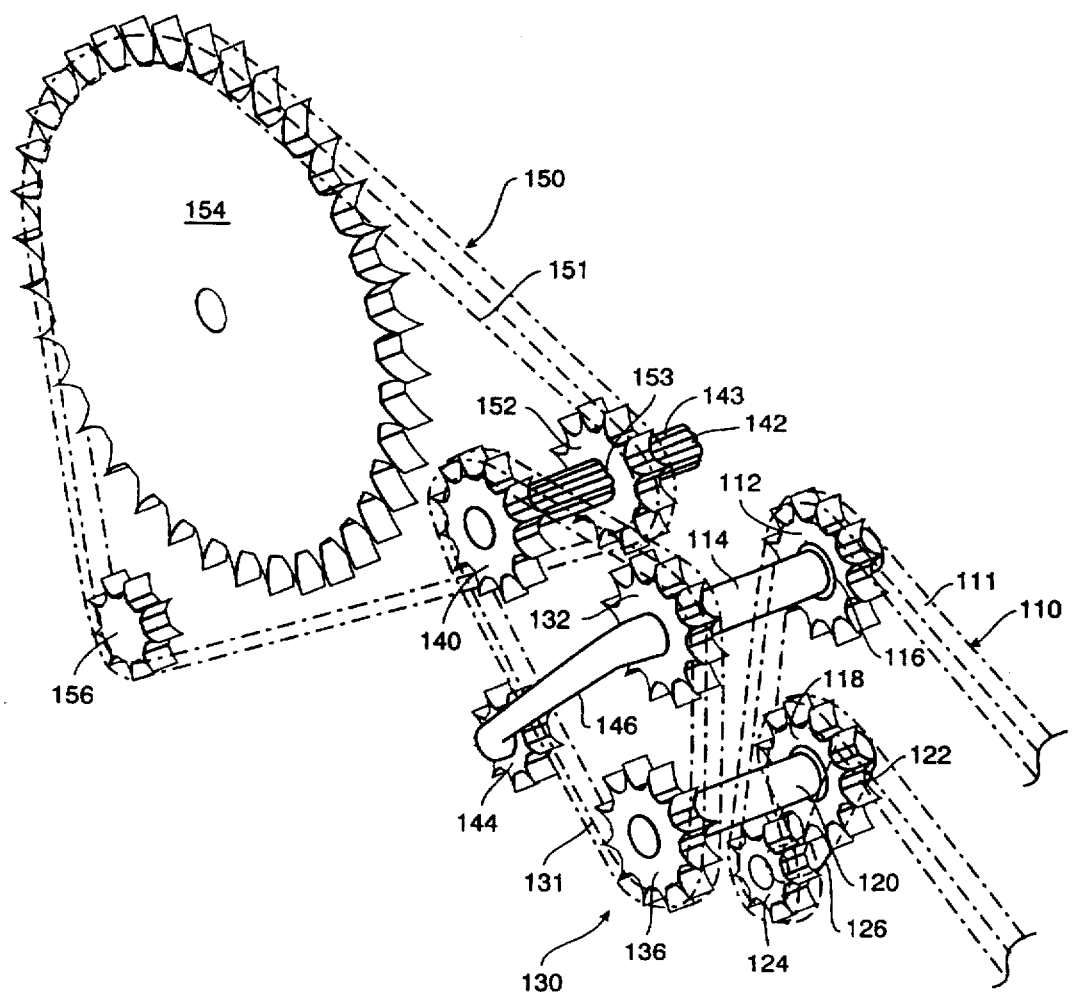
FIG. 9 is an isometric detail view of the chain drive system of FIG. 8.

Although the present invention has been described above making use of gears, persons skilled in this art will recognize that chain drive arrangements could alternatively be used with essentially equivalent results. A preferred embodiment of a reverse pedal chain drive arrangement 100 is shown in FIGS. 8 and 9 and 9 and illustrates how the reversing effects described above are achieved with a chain drive arrangement. The chain drive arrangement 100 preferably comprises three chains assemblies: a first chain assembly or main chain assembly 110 having a main chain 111 operably connected to and driven in either direction by a pedal sprocket 105 and pedals 102 and 103 assembly; a second chain assembly or drive chain assembly 150 having a drive chain 151 operably connected to a multi-gear sprocket 154 mounted on a rear or drive wheel 155; and, a third chain assembly or collector chain assembly 130 operably connected to the main chain and drive chain assemblies 110 and 150. The collector chain assembly 130 collects the pedal force from the main chain assembly 110 and transfers that force to the drive chain assembly 150.

More particularly, the main chain 111 of the main chain assembly 110 loops around and engages the pedal sprocket 105, a forward pedaling sprocket 112, a reverse pedaling sprocket 118, and a main chain idler sprocket 124 interposed along the main chain 111 between the forward and reverse pedaling sprockets 112 and 118. The main chain idler sprocket 124 which is mounted on a spring loaded support member 126 interconnected to the reverse pedaling sprocket 118, takes up slack in the main chain 111.

To accommodate pedaling in either a forward or reverse direction, the forward and reverse pedaling sprockets 112 and 118 are mounted on freewheeling clutches 116 and 122, respectively. The freewheeling clutches 116 and 122 are fixed to shafts 114 and 120, respectively, which rotate within bearings 166 and 167, respectively, mounted in a frame 160. The freewheeling clutches 116 and 122 allow the sprockets 112 and 118 to rotate freely in the counterclockwise direction, i.e., without applying any pedal force to the shafts 114 and 120, but rotate with and drive the shafts 114 and 120, i.e., applying pedal force to the shafts 114 and 120, in the clockwise direction. The configuration of the main chain assembly 110 allows for one freewheeling sprocket 112 or 118 to move clockwise while the second freewheeling sprocket 112 or 118 moves counterclockwise.

The collector chain assembly 130 includes a collector chain 131 that loops around a forward pedaling collector sprocket 132, a reverse pedaling collector sprocket 136 and a transfer sprocket 140. Slack in the collector chain 131 is taken up by an idler sprocket 144 that is mounted on a spring loaded support member 146. The idler sprocket 144 interposes the collector sprocket 136 and the transfer sprocket 140 along the collector chain 131.

The pedaling force and clockwise motion output from the main chain assembly 110 is collected and transferred to the collector chain assembly 130 via the forward and reverse pedaling collector sprockets 132 and 136. The collector sprockets 132 and 136 are mounted on the shafts 114 and 120 and, thus, rotate in a clockwise direction when the shafts 114 and 120 are rotated in a clockwise direction.

The drive chain assembly 150 includes a drive chain 151 that loops around a drive sprocket 152, a multi-gear sprocket 154 mounted on a rear/drive wheel 155, and a spring loaded idler sprocket 156 used to take up slack in the drive chain 151. To transfer the pedaling force and clockwise motion of the main chain assembly 110 to the drive chain assembly 150, the transfer sprocket 140 of the collector chain assembly 130 is interconnected to the drive sprocket 152 via a shaft 142. The shaft 142 rotates in a bearing 168 mounted in the mounting plate 160. The transfer sprocket 140 is fixed to one end of the shaft 142 while the drive sprocket 152 is slidably coupled to the shaft 142 to accommodate gear changes. A series of teeth 153 are cut into the inner hub 153 of the drive sprocket 152 to mate with a series of splines 143 cut in the shaft 142. This configuration allows the drive sprocket 152 to slide axially along the shaft 142 and rotate in unison with the shaft 142.

In operation, when the bicyclist rotates the pedals 102 and 103 in the forward or clockwise direction, the pedal sprocket 105, the main chain 111 and the forward pedaling sprocket 112 also rotate in the clockwise direction. The clockwise rotation of the forward pedaling sprocket 112 causes the freewheeling clutch 116 to engage, which in turn causes the shaft 114 and forward pedaling collector sprocket 132 to rotate in unison with the forward pedaling sprocket 112. This action imparts a clockwise motion to the collector chain 131, the transfer sprocket 140, the shaft 142 and the drive sprocket 152. The clockwise rotation of the drive sprocket 152 causes the drive chain 151, the multi-gear sprocket 154 and the rear wheel 155 to rotate in the clockwise direction.

The forward or clockwise rotation of the pedals 102 and 103, in addition to imparting clockwise rotation to the forward pedaling sprocket 112, rotates the reverse pedaling sprocket 118 in the counterclockwise direction. The freewheeling clutch 122 does not engage however, thereby allowing the reverse pedaling sprocket 118 to rotate in the counterclockwise direction while the pedals 102 and 103 rotate in the forward or clockwise direction.

When the bicyclist rotates the pedals 102 and 103 in the reverse or counterclockwise direction, the pedal sprocket 105 and the main chain 111 rotate in the counterclockwise direction while the reverse pedaling sprocket 118 rotates in the clockwise direction. The clockwise rotation of the reverse pedaling sprocket 118 causes the freewheeling clutch 122 to engage, which in turn causes the shaft 120 and the reverse pedaling collector sprocket 136 to rotate in unison with the reverse pedaling sprocket 118. This action imparts a clockwise motion to the collector chain 131, the transfer sprocket 140, the shaft 142 and the drive sprocket 152. The clockwise rotation of the drive sprocket 152 causes the drive chain 151, the multi-gear sprocket 154 and the rear wheel 155 to rotate in the clockwise direction.

The reverse or counterclockwise rotation of the pedals 102 and 103, in addition to imparting clockwise rotation to the reverse pedaling sprocket 118, rotates the forward pedaling sprocket 112 in the counterclockwise direction. The freewheeling clutch 116 does not engage however, thereby allowing the forward pedaling sprocket 112 to rotate in the counterclockwise direction while the pedals 102 and 103 rotate in the reverse or counterclockwise direction. Thus, with this chain drive arrangement 100, the bicyclist can pedal alternatively clockwise or counterclockwise.

Furthermore, the chain drive arrangement 100 is easily mounted on the frame of an existing bicycle. The bicycle's stock chain is removed and the mounting plate 160 is mounted to the frame tubes 163 and 165 of the bicycle using brackets 162 and 164. After mounting plate 160, the main chain 111, the collector chain 131 and the drive chain 151 are easily mounted or looped around their respective sprockets. In a preferred construction the sprockets, shafts and mounting plate of the chain drive arrangement 100 are formed from a generally light weight, high strength material, such as aluminum.

While the above description contains many specificities, these should not be construed as limitations on the scope of the invention, but rather as an exemplification of one preferred embodiment thereof. Other variations are possible.

Accordingly, the scope of the present invention should be determined not by the embodiments illustrated above, but by the appended claims and their legal equivalents.

What is claimed is:

1. A drive mechanism for a bicycle comprising
   a pedal sprocket,
   a first chain assembly operably connected to said pedal sprocket, and
   a second chain assembly operably interconnected to said first chain assembly and a drive wheel of a bicycle, said first chain assembly being capable of imparting a forward or clockwise rotation to said second chain assembly when said pedal sprocket is driven in either a clockwise or counterclockwise direction.

2. The drive mechanism of claim 1, wherein said first chain assembly comprises forward and reverse pedaling sprockets operably interconnected to said pedal sprocket.

3. The drive mechanism of claim 2, wherein said second chain assembly comprises a drive sprocket operably interconnected to said forward and reverse pedaling sprockets.

4. The drive mechanism of claim 2, wherein said forward and reverse pedaling sprockets are mounted on first and second shafts by first and second clutches, said first and second clutches enabling said forward and reverse pedaling sprockets to freely rotate in the counterclockwise direction about said first and second shafts and to rotate with and drive said first and second shafts in a clockwise direction.

5. The drive mechanism of claim 4, wherein said forward and reverse pedaling sprockets are adapted to rotate in opposite directions, said forward pedaling sprocket being adapted to rotate in the clockwise and counterclockwise direction when said pedal sprocket is rotated in the clockwise and counterclockwise directions, said reverse pedaling sprocket being adapted to rotate in the counterclockwise and clockwise direction when said pedal sprocket is rotated in the clockwise and counterclockwise directions.

6. The drive mechanism of claim 1, further comprising a third chain assembly interposed between and operably interconnected to said first and second chain assemblies.

7. The drive mechanism of claim 6, wherein said first chain assembly comprises forward and reverse sprockets operably interconnected to said pedal sprocket.

8. The drive mechanism of claim 7, wherein said third chain assembly comprises a plurality of collector sprockets operably interconnected to said forward and reverse pedaling sprockets.

9. The drive mechanism of claim 8, wherein said second chain assembly comprises a drive sprocket operably interconnected to said plurality of collector sprockets.

10. The drive mechanism of claim 7, wherein said third chain assembly comprises first and second collector sprockets operably interconnected to a transfer sprocket, said first and second collector sprockets being operably interconnected to said forward and reverse pedaling sprockets of said first chain assembly.

11. The drive mechanism of claim 10, wherein said second chain assembly comprises a drive sprocket operably interconnected to said transfer sprocket of said third chain assembly.

12. The drive mechanism of claim 4, further comprising a third chain assembly interposed between and operably interconnected to said first and second chain assemblies.

13. The drive mechanism of claim 12, wherein said third chain assembly comprises first and second collector sprockets operably interconnected to a transfer sprocket, said first and second collector sprockets being mounted on said first and second shafts and operably interconnected to said forward and reverse pedaling sprockets of said first chain assembly.

14. The drive mechanism of claim 13, wherein said second chain assembly comprises a drive sprocket operably interconnected to said transfer sprocket of said third chain assembly.

15. A pedal mechanism for driving a bicycle comprising
a pedal sprocket,
- a first sprocket operably connected to said pedal sprocket by a first chain, said first sprocket being mounted on a first shaft by a first freewheeling clutch to rotate freely on said first shaft in a counterclockwise direction and to rotate with and to drive said first shaft in a clockwise direction, and
- a second sprocket operably connected to said pedal sprocket and said first sprocket by said first chain, said second sprocket being mounted on a second shaft by a second freewheeling clutch to rotate freely on said second shaft in a counterclockwise direction and to rotate with and to drive said second shaft in a clockwise direction.

16. The pedal mechanism of claim 15, wherein said first and second sprockets rotate in opposite directions.

17. The pedal mechanism of claim 15, further comprising a third sprocket operably interconnected to said first and second sprockets and a drive wheel.

18. The pedal mechanism of claim 15, further comprising
a third sprocket mounted on said first shaft,
a fourth sprocket mounted on said second shaft, and
a fifth sprocket operably connected to said third and fourth sprockets by a second chain.

19. The pedal mechanism of claim 18, further comprising a sixth sprocket interconnected to said fifth sprocket and operably interconnected to a drive wheel.

20. The pedal mechanism of claim 19, further comprising a multi-gear sprocket mounted on the drive wheel and operably connected to said sixth sprocket by a third chain.

21. A bicycle comprising
a pedal shaft,
a drive wheel,
a drive mechanism operably interconnected to said pedal shaft, said drive mechanism including at least a first chain assembly and a second chain assembly operably interconnected so that said first chain assembly drives said second chain assembly, said second chain assembly operably interconnected with said drive wheel for driving said drive wheel, said drive mechanism capable of imparting unidirectional movement in said second chain assembly causing forward or clockwise motion in said drive wheel regardless of the rotational direction of said pedal shaft.

22. The bicycle of claim 21, wherein said drive mechanism comprises
- a first rotating member capable of imparting a forward motion to the drive wheel when said pedal shaft is driven in a clockwise direction, and
- second rotating member capable of imparting a forward motion to the drive wheel when said pedal shaft is driven in counterclockwise direction.

23. The bicycle of claim 21, wherein said drive mechanism further comprises a third chain assembly operably interconnected with said first and second rotating members and said second chain assembly.

24. The bicycle of claim 21, wherein said drive mechanism is universally adaptable to existing bicycles.

25. The bicycle of claim 21, wherein said unidirectional movement is in a forward direction.

* * * * *